United States Patent [19]

Tanaka et al.

[11] Patent Number: 4,747,667
[45] Date of Patent: May 31, 1988

[54] PLASTIC LENS ARRAY

[75] Inventors: Akira Tanaka, Kawasaki; Eietsu Takahashi, Machida; Masao Tanaka, Kawasaki; Minoru Terashima, Suzaka; Toshito Hara, Sagamihara, all of Japan

[73] Assignee: Fujitsu Limited, Kawasaki, Japan

[21] Appl. No.: 860,483

[22] Filed: May 7, 1986

[30] Foreign Application Priority Data

| May 9, 1985 | [JP] | Japan | 60-098551 |
| Jun. 28, 1985 | [JP] | Japan | 60-141623 |
| Apr. 25, 1986 | [JP] | Japan | 61-094840 |

[51] Int. Cl.$^4$ .......................... G02B 13/26; G02B 5/04
[52] U.S. Cl. ..................................... 350/167; 350/286
[58] Field of Search ................ 350/167, 286, 287, 445

[56] References Cited

U.S. PATENT DOCUMENTS

| 3,360,323 | 12/1967 | Weisman et al. | 350/286 |
| 3,449,158 | 6/1969 | Rowland | 350/167 |
| 3,514,182 | 5/1970 | Banks | 350/286 |
| 3,544,190 | 12/1970 | Moorhusen et al. | 350/167 |
| 3,597,701 | 8/1971 | Cornillault | 350/286 |
| 3,836,249 | 9/1974 | Weber | 350/167 |

*Primary Examiner*—John K. Corbin
*Assistant Examiner*—Martin Lerner
*Attorney, Agent, or Firm*—Staas & Halsey

[57] ABSTRACT

A plastic lens array including the following members which are formed integrally as one block by a plastic material; a lens array body member; a plurality of object convex lenses into which the light from an object is made incident, the object convex lenses being arranged side by side in one row along one side of the lens array body member; a plurality of image convex lenses corresponding to the object convex lenses, and being arranged side by side in a row along an opposite side of the lens array body member; a plurality of image inverting portions corresponding to the object convex lenses, each of the image inverting portions having a pair of roof surfaces which are substantially normal to each other to invert the image of an object; a first reflecting surface arranged at the backs of the object convex lenses, for totally reflecting the incident light of an object through the object convex lenses with an angle exceeding a critical angle and for guiding the reflected light of the object to a roof surface in each pair of the roof surfaces; and a second reflecting surface arranged at the backs of the image convex lenses, for totally reflecting the inverted light of an object from the other roof surface in each pair of the roof surfaces with an angle exceeding the critical angle and for guiding the reflected light of an object to the image convex lenses.

11 Claims, 9 Drawing Sheets

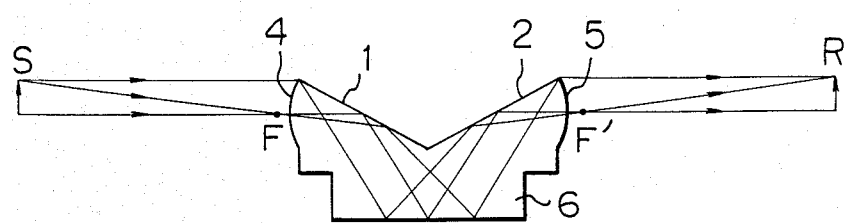
Fig. 4
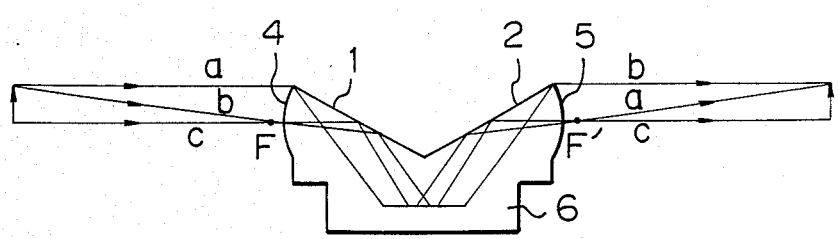
Fig. 5
Fig. 6
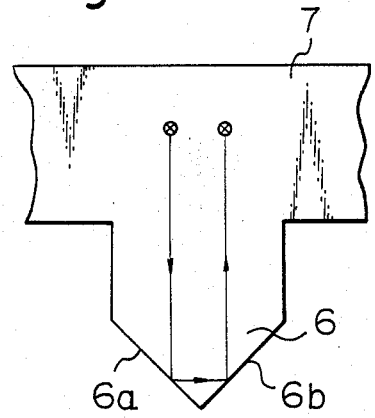

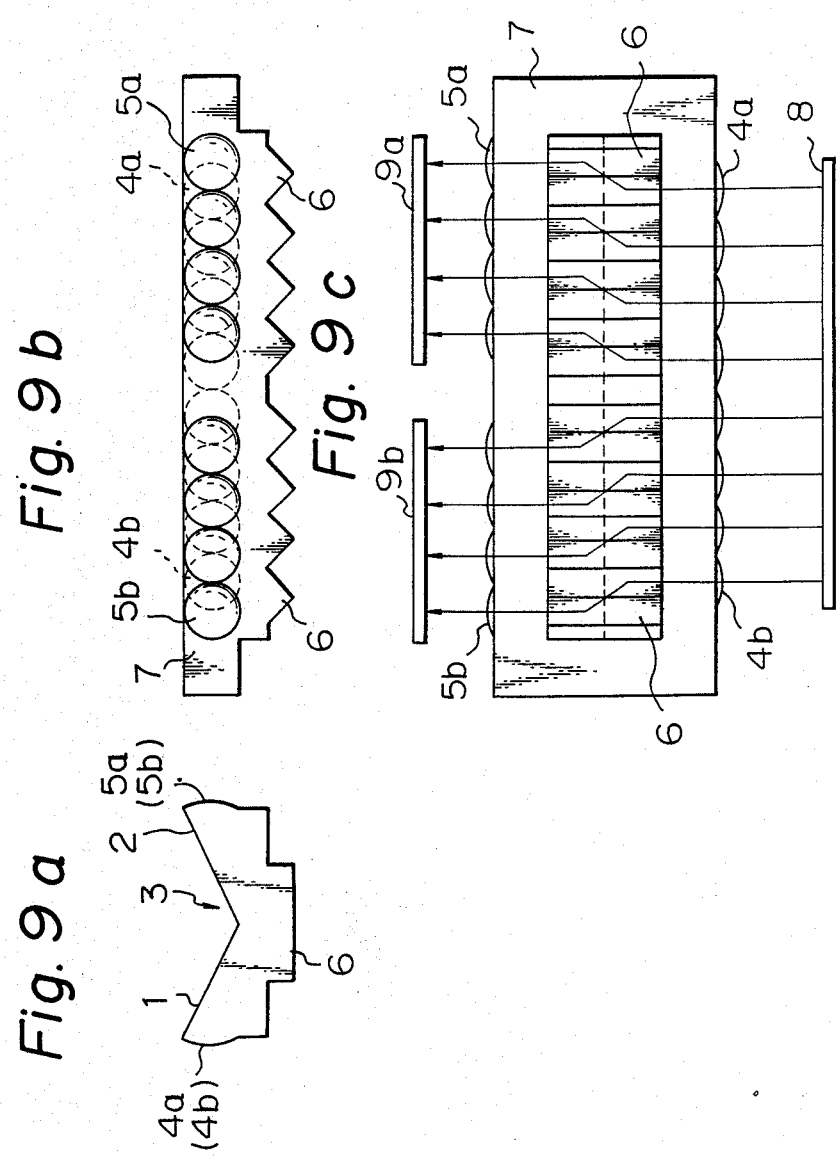

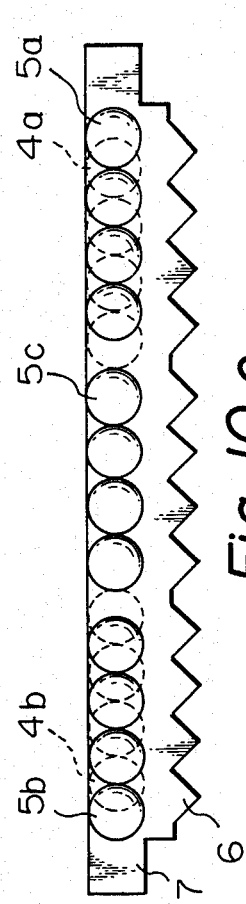
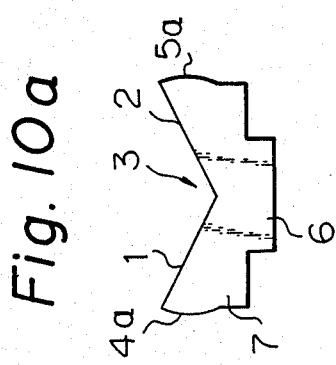
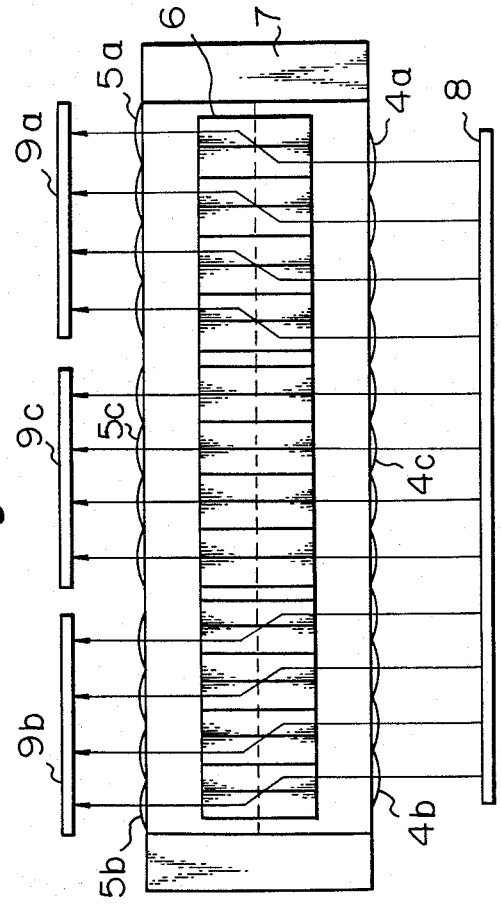

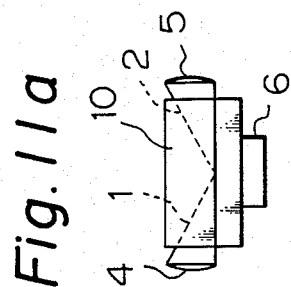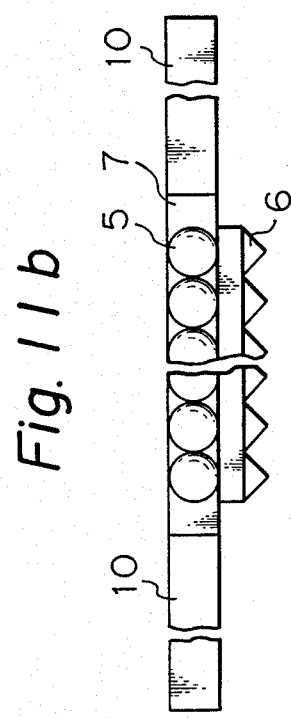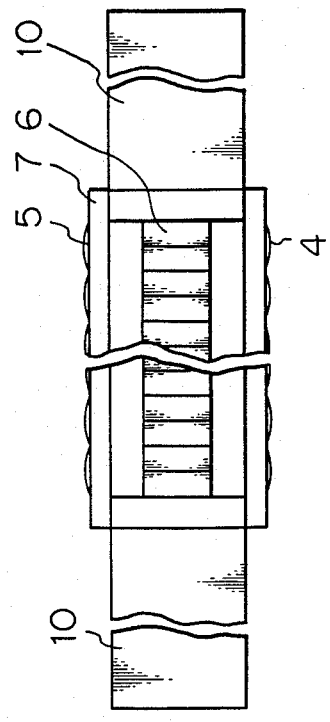

PLASTIC LENS ARRAY

FIELD OF THE INVENTION

The present invention relates to a lens array for forming an erect image of unit magnification and adopted in document reading or in image formation for a copying machine, a printer, a facsimile, etc.

An LED type recording apparatus or a liquid crystal type recording apparatus includes a photosensitive drum, around which are arranged a uniformly charging portion, an image forming portion, a developing portion, a transferring portion, a cleaning portion, an electric discharging portion, etc. At the image forming portion, an image corresponding to an image to be recorded is formed on the photosensitive drum by means of an LED array or a liquid crystal. In order to guide the light emitted from the LED array or the liquid crystal at the image forming portion onto the photosensitive drum, a light guiding lens array is used.

A document reading device adopted for a facsimile, etc., detects by means of an image sensor, etc., the light which is emitted from LEDs and reflected from a document, and converts the detected light into electric image signals. In order to guide the reflected light to the image sensor, the light guiding lens array is used.

An electrographic plain paper copying machine includes a photosensitive drum, around which, similar to the above recording apparatus, are arranged a uniformly charging portion, an image forming portion, a developing portion, a transferring portion, a cleaning portion, an electric discharging portion, etc. At the image forming portion, an original to be copied is irradiated with the light to form an image corresponding to the document on the photosensitive drum by virtue of the light reflected from the document. In order to guide the light reflected from the document to the photosensitive drum, the light guiding lens array is used.

The present invention is applicable to such a light guiding lens array adopted for the recording apparatus, document reading apparatus, copying machine, etc.

A prior art lens array structure is disclosed in, for instance, published Japanese Patent Application No. 58-86515. This lens array comprises two kinds of Porro prisms which are right-and-left symmetrical and continuously combined one after another. Each Porro prism comprises three rectangular prisms, in which a bottom surface of a first rectangular prism is in contact with second and third rectangular prisms in such a manner that bottom surfaces of the second and third rectangular prisms will face upward and downward respectively. Convex lenses are provided under a lower surface of the second rectangular prism and on an upper surface of the third rectangular prism respectively. According to this arrangement, the incident light from an object into one of the convex lenses is radiated out of the other convex lens to form an erected real image of the object.

Another prior art lens array structure is disclosed in published Japanese Patent Application No. 57-202515. This lens array structure comprises a plurality of solidly formed lens elements which are arranged continuously. Each of the solidly formed lens elements has a pair of convex lens surfaces having a common optical axis; another pair of convex lens surfaces having respective optical axes orthogonal to the common optical axis; and a pair of reflecting surfaces formed inside the two pairs of convex lens surfaces. The reflecting surfaces are coated with metallic reflective films. According to this arrangement, the incident light from an object into one of the convex lens surfaces having the common optical axis is radiated out of the other convex lens surface to form an erect image of unit magnification of the object.

In the lens array structure disclosed in the Japanese Patent Application No. 58-86515, an angle of a reflecting surface of the prism is restricted to 45° with respect to an optical axis. As a result, a light receiving area of the prism, in which the light may be totally reflected with an angle exceeding a critical angle, is limited to a narrow region, and the light from other than this narrow region is not reflected by the prism but passes through the prism so that the light radiated from the prism will become dark. Since the angle of the reflecting surface of prism is restricted to 45°, the overall shape of the lens systems is limited, and therefore, a compact and thin lens system is not realized. Further, this lens array requires more assembly processes, deteriorating the productivity, because two different kinds of Porro prisms must be manufactured and assembled to provide a complete lens array.

In the lens array disclosed in the Japanese Patent Application No. 57-202515, each lens element must be coated with reflective film so that the number of manufacturing processes is increased. Further, the lens elements must be arranged and engaged in an array that will reqire more time for assembling and thus deteriorate the productivity.

SUMMARY OF THE INVENTION

In view of the drawbacks of the prior art mentioned above, the objects of the present invention are to provide a lens array which has a wide range of light receiving angles in which the light can be totally reflected to make the lens array brighter, requires no coatings such as reflective films, and is wholly formed in one body so that the lens array will have a compact shape which is easy to assemble, to improve productivity.

In order to accomplish the objects mentioned above, the present invention provides a plastic lens array comprising the following members which are formed integrally as one block by a plastic material:

a lens array body member;
  a plurality of object convex lenses into which the light from an object is made incident, the object convex lenses being arranged side by side in a row along one side of the lens array body member;
  a plurality of image convex lenses corresponding to the object convex lenses, and being arranged side by side in a row along the opposite side of the lens array body member;
  a plurality of image inverting portions corresponding to the object convex lenses, each of the image inverting portions having a pair of roof surfaces which are substantially normal to each other to invert the image of the object;
  a first reflecting surface arranged at the backs of the object convex lenses, for totally reflecting the incident light of an object through the object convex lenses with an angle exceeding a critical angle and for guiding the reflected light of the object to one of the roof surfaces in each pair of the roof surfaces; and
  a second reflecting surface arranged at the backs of the image convex lenses, for totally reflecting the inverted light of an object from the other roof surface in each pair of the roof surfaces with an angle exceeding the critical angle and for guiding the reflected light of the object to the image convex lenses.

BRIEF DESCRIPTION OF THE DRAWINGS

These and other objects and features of the present invention will become apparent from the following description with reference to the accompanying drawings, in which:

FIGS. 2(a) to 2(c) are views showing the constitution of the embodiment shown in FIG. 1, wherein FIG. 2(a) is a side view, FIG. 2(b) a front view, and FIG. 2(c) a bottom view;

FIG. 4 is a view for explaining optical paths of an image according to the embodiment shown in FIGS. 2(a) to 2(c);

FIG. 5 is a view for explaining optical paths of an image according to the embodiment shown in FIGS. 3(a) to 3(c);

FIG. 6 is a view for explaining the function of a roof member;

FIGS. 8 to 11 are views showing, in ways similar to FIG. 2, the constitution of other embodiments respectively according to the present invention.

DESCRIPTION OF THE PREFERRED EMBODIMENTS

Figure 1:
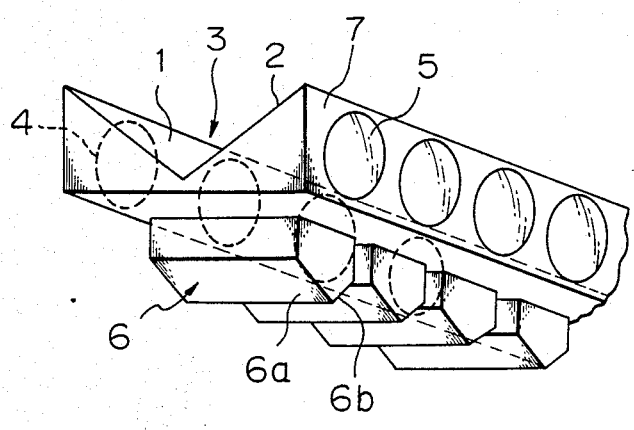
FIG. 1 is a perspective view showing an embodiment according to the present invention.

FIG. 1 is a perspective view showing an embodiment according to the present invention. A plurality of object convex lenses 4 are arranged side by side in a row along one side of an array body member 7. Along the opposite side of the array body member 7, are arranged a plurality of image convex lenses 5 corresponding to the object convex lenses 4. At the bottom of the array body member 7, roof members 6 are provided. Each of the roof members 6 comprises a pair of roof surfaces 6a and 6b which are substantially normal to each other. The roof members 6 are arranged in parallel with one another in such a manner that each of the roof members 6 corresponds to a pair of the object and image lenses 4 and 5. A V-groove 3 is formed at the top of the array body member 7. The V-groove 3 is formed along a longitudinal axis of the array body member 7, namely, along the rows of lenses 4 and 5. Slant side faces of the V-groove 3 are located at the backs of the object and image convex lenses 4 and 5, respectively, to constitute a first reflecting surface 1 and a second reflecting surface 2, respectively. The object convex lenses 4, image convex lenses 5, and roof members 6 are made simultaneously and integrally with the array body member 7 as one body by a plastic material by using a mold. As the plastic material, polymethyl methacrylate, polycarbonate, polystyrene, poly-4-methylpenten-1, etc., may be used. By forming the whole of lens array in one solid block, reflective film coating and parts assembling work will not be required, simplifying the manufacturing work and improving productivity.

Figure 2A:
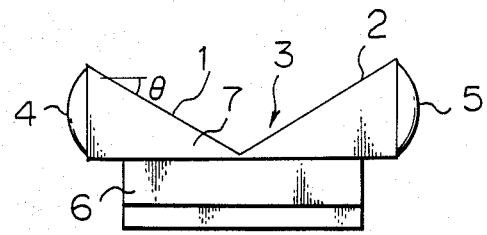
Figure 2B:
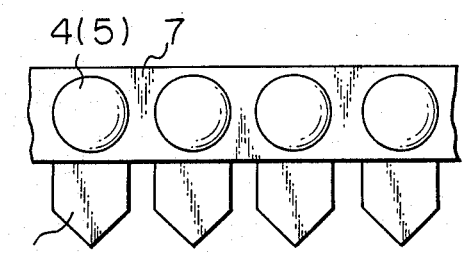
Figure 2C:
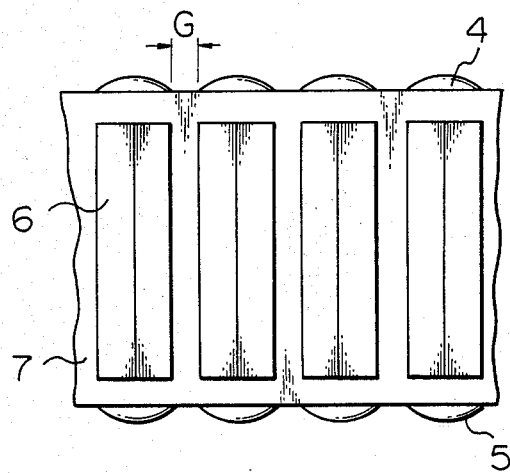

Such a lens array is shown in FIGS. 2(a) to 2(c), in which FIG. 2(a) is a side view, FIG. 2(b) a front view, and FIG. 2(c) a bottom view. Angles $\theta$ of the first reflecting surface 1 and of the second reflecting surface 2 are formed in such a manner that the respective angles of perpendicular lines of the reflecting surfaces 1 and 2 with respect to the optical axes of the lenses 4 and 5 exceed a critical angle. A corresponding pair of the object and image convex lenses 4 and 5 is coaxially arranged to have a common optical axis. In this coaxial arrangement, it is preferable to provide a gap G between adjacent lenses. Due to the provision of gap G, optical interference is prevented from occurring between adjacent lenses, and when the lens array is used, for instance, for reading a document, the document reading area of each lens is properly separated to realize a good reading operation. The V-groove 3 is formed in such a manner that the top of V-groove 3 is positioned at the same level as the lower lines of lenses 4 and 5 or below, to make a sufficient and effective use of the entire diameter of each of the lenses 4 and 5.

An optical path in one of the roof members 6 is shown in FIG. 6. Each roof member 6 comprises two roof surfaces 6a and 6b which are substantially normal to each other. The light from the upper part (actually, from the oblique upper part) reaches one roof surface 6a, is reflected thereby, proceeds toward another roof surface 6b, and is again reflected upwardly (toward the oblique upper part on the other side). In this way, by reflecting the light by the pair of roof surfaces 6a and 6b, the image of an object is inverted and transmitted.

FIG. 4 shows optical paths in an image formation in the lens array shown in FIG. 2. The marks F and F' indicate focal points of the object convex lens 4 and the image convex lens 5, respectively. The light from an object S enters the lens array through the object convex lens 4 and is totally reflected by the first reflecting surface 1 with an angle which exceeds a critical angle. As explained with reference to FIG. 6, the totally reflected light is inverted by the roof member 6 and proceeds toward the second reflecting surface 2. The light inverted by the roof member 6 is totally reflected by the second reflecting surface 2 with an angle which exceeds the critical angle. The light totally reflected by the second reflecting surface 2 is radiated out of the image convex lens 5 to form an erect image R at an unit magnification.

As mentioned above, the first and second reflecting surfaces 1 and 2 are constituted in such a manner that the light from the object convex lens 4 and the light from the roof member 6 are totally reflecting by the reflecting surfaces 1 and 2, respectively, each with an angle which exceeds the critical angle. As a result, coating of a reflective film is not required. Further, an angle of the reflecting surface is not limited to 45° as required in the prior art. As a result, a thin and compact lens array can be realized according to the present invention.

In FIG. 4, optical paths which pass through a center cross section of each lens are shown to be inverted in the vicinity of the top of the roof member 6.

Figure 7:
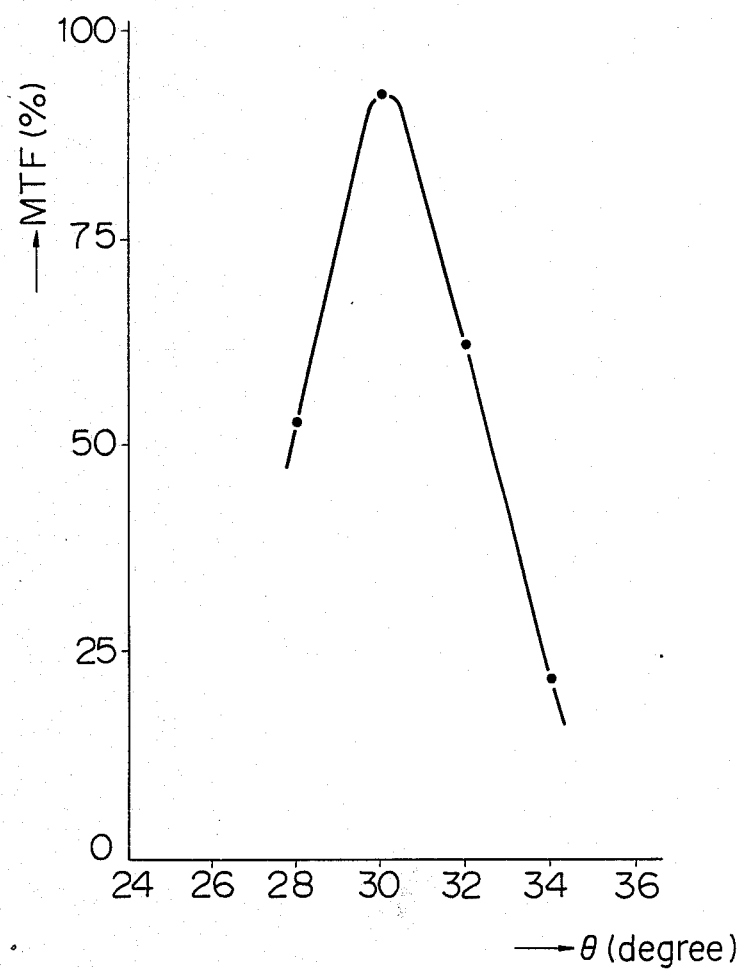
FIG. 7 is a graph showing a relationship between an angle of reflecting surface of the lens array and MTF, according to the present invention.

FIG. 7 is a graph showing the MTF of the lens array with respect to various angles $\theta$ of the first and second reflecting surfaces 1 and 2. As seen from the graph, the MTF takes the maximum value (92%) when the $\theta$ is 30°. The measurement was made under the condition of 6 lp/mm, and the lens array used in the experiment was of polymethyl methacrylate material and under the following conditions:

Radius of lens curvature: R=2.8 mm
Distance between object and lens: $l_0$=5.7 mm Lens Diameter: D=1.5 mm
Distance between object lens and image lens: L=5.4 mm
Lens pitch: P=2.0 mm
Focal length: f=5.4 mm
F-Number: F=3.8

As seen in the graph, by setting the angle θ of each reflecting surface to 30°, the range of the light receiving angle, in which the light from the object lens is totally reflected, is widened, and the lens becomes brighter in comparison with the prior art in which the angle is limited to 45°.

Figure 3A:
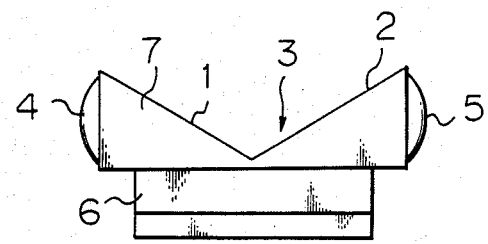
FIGS. 3(a) to 3(c) are views showing, in ways similar to FIGS. 2(a) to 2(c), the constitution of another embodiment according to the present invention.
Figure 3B:
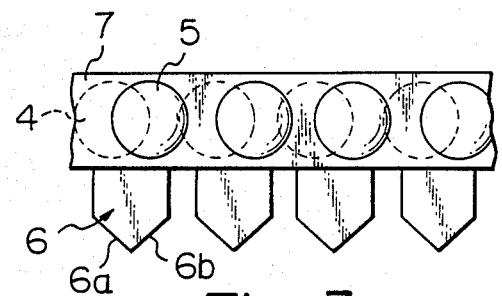
Figure 3C:
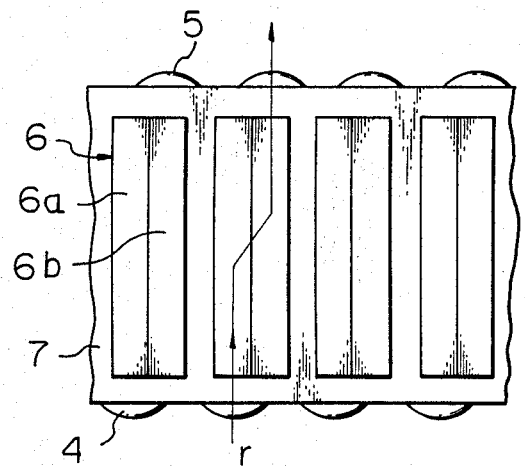

FIGS. 3(a) to 3(c) shows the constitution of another embodiment according to the present invention. This embodiment differs from the embodiment shown in FIGS. 2(a) to 2(c) in that the optical axes of a pair of the object and image convex lenses 4 and 5 are disclosed relative to each other in a horizontal direction (along the lens array). Each roof member 6 is located in the middle of the optical axes of each pair of the object and image convex lenses 4 and 5 in connection with the horizontal direction. According to this arrangement, most of the light through the object convex lens 4 is reflected by a central portion of the roof surface 6a, as indicated by an arrow r shown in FIG. 3(c), reflected further by a central portion of the roof surface 6b, and passed through the image convex lens 5. Therefore, the light to be inverted does not pass the top portion of the roof member 6. As a result, a good image can be obtained even if the manufacturing accuracy of the top portion is rough.

FIG. 5 is a view showing optical paths in the above embodiment of FIG. 3. The constitution, action, and effect of the above embodiment other than the above-mentioned difference are the same as those of the embodiment shown in FIG. 2.

Figure 8A:
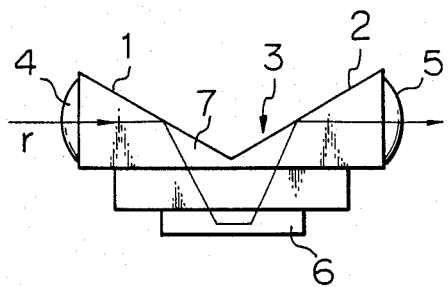
Figure 8B:
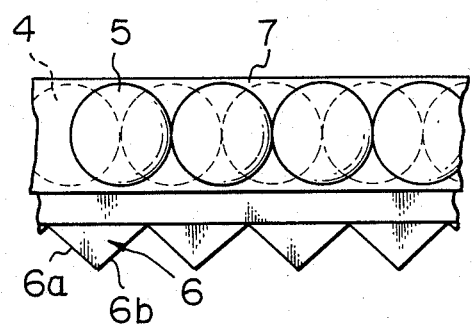
Figure 8C:
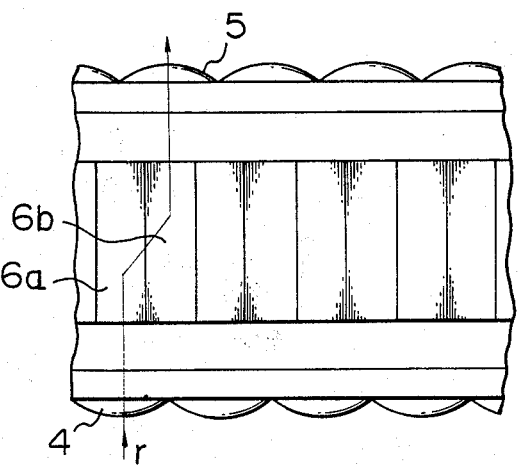

FIG. 8 shows still another embodiment according to the present invention. This embodiment is substantially the same as the embodiment shown in FIG. 3, but differs therefrom in that adjacent lenses in the row of object convex lenses 4 and in the row of image convex lenses 5 are formed so that they are almost in contact with each other. When the optical axis of each object convex lens 4 and the optical axis of each image convex lenses 5 are dislocated with respect to each other, the optical interference between the adjacent lenses is minimized, and a good image is obtained even if a gap is not provided between the adjacent lenses. According to the above arrangement, a compact lens array can be obtained. The constitution, action, and effect of this embodiment other than the above-mentioned difference are the same as those of the embodiment shown in FIG. 3.

FIG. 9 shows still another embodiment according to the present invention. In this embodiment, the lens array is divided into two groups, i.e., a left half group and a right half group. In each of the groups, the optical axes of the image convex lenses 5a and 5b are dislocated outwardly (toward outer ends of the array body member) relative to the optical axes of the object convex lenses 4a and 4b, respectively. Namely, as shown in FIG. 9(c), in the right half lens group, the optical axis of each image convex lens 5a is dislocated rightwardly relative to the optical axis of each object convex lens 4a, and in the left half lens group, the optical axis of each image convex lens 5b is dislocated leftwardly relative to the optical axis of each object convex lens 4b. When the above arrangement is adopted for, for instance, an optical reading device, a single document 8 can be read by using two CCD image sensors 9a and 9b. The CCD image sensors which are manufactured from silicon wafers are limited in their dimensions, and therefore, a gap may be formed between two CCD image sensors when they are arranged in the device. In spite of the existence of such a gap, the original can be continuously read according to this embodiment. As a result, a large sized document can be read.

FIG. 10 shows still another embodiment according to the present invention. In this embodiment, a lens array is divided into three groups. In two outer side groups, the optical axes of image convex lenses 5a and 5b are disclosed outwardly relative to the optical axes of the object convex lenses 4a and 4b respectively, while in a middle group, the optical axes of each image convex lens 5c and each object convex lens 4c coincide with each other. CCD image sensors 9a, 9b and 9c are arranged on the side of image convex lenses 5a, 5b, and 5c to correspond to the three groups, respectively. According to this arrangement, a single original 8 provided on the side of object convex lenses 4a, 4b, and 4c can be read by using three CCD image sensors 9a, 9b, and 9c so that a larger original can be read in comparison with the embodiment shown in FIG. 9.

FIG. 11 shows another embodiment according to the present invention. In this embodiment, array fitting pieces 10 projecting outwardly from both ends of the array body member 7 are integrally formed with the array body member 7. According to this arrangement, the lens array may be easily assembled for a reading device, etc., due to the provision of solidly formed fitting pieces 10 having no dispersion in accuracy, and the uniformity of products can be maintained.

We claim:
1. A plastic lens array including the following members which are formed integrally as one block by a plastic material, comprising:
   (a) a lens array body member;
   (b) a plurality of object convex lenses into which a light from an object is made incident, said plurality of object convex lenses being arranged side by side in one row along one side of said lens array body member;
   (c) a plurality of image convex lenses corresponding to said plurality of object convex lenses, and being arranged side by side in a row along an opposite side of said lens array body member;
   (d) a plurality of image inverting portions corresponding to said object convex lenses, each of said plurality of image inverting portions having a pair of first and second roof surfaces which are substantially normal to each other to invert an image of the object;
   (e) a first reflecting surface arranged at the backs of said plurality of object convex lenses, for totally reflecting said incident light of the object through said plurality of object convex lenses with an angle exceeding a critical angle and for guiding said reflected light of the object to the first roof surface in each pair of said first and second roof surfaces; and
   (f) a second reflecting surface arranged at the backs of said plurality of image convex lenses, for totally reflecting said inverted light of the object from the first roof surface in each pair of said first and second roof surfaces with an angle exceeding the critical angle and for guiding said reflected light of the object to said plurality of image convex lenses.

2. A plastic lens array as claimed in claim 1, wherein respective corresponding ones of the pluralities of object convex lenses, image inverting portions, and image convex lenses are arranged to form an erected real image of unit magnification of said object.

3. A plastic lens array as claimed in claim 1, wherein said first reflecting surface and said second reflecting surface are side surfaces respectively of a V-groove which is formed on a top surface of said lens array body member.

4. A plastic lens array as claimed in claim 1, wherein each corresponding one of said plurality of object convex lenses and said plurality of image convex lenses are located such that the optical axes thereof coincide with each other.

5. A plastic lens array as claimed in claim 4, wherein each of said plurality of object convex lenses is spaced apart from adjacent ones of the plurality of object convex lenses to prevent optical interference from occurring between adjacent ones of said plurality of object convex lenses, and each of said plurality of image convex lenses is also spaced apart from adjacent ones of the plurality of image convex lenses for the same prevention.

6. A plastic lens array as claimed in claim 1, wherein each corresponding one of said plurality of object convex lenses and said plurality of image convex lenses are located such that the optical axes thereof are dislocated relative to each other.

7. A plastic lens array as claimed in claim 5, wherein each of said plurality of object convex lenses is arranged to be almost in contact with adjacent ones of said plurality of object convex lenses, and each of said plurality of image convex lenses is arranged also to be almost in contact with adjacent ones of said plurality of image convex lenses.

8. A plastic lens array as claimed in claim 1, wherein an angle of said first reflecting surface with respect to the optical axis of each of said plurality of object convex lenses is approximately 30°, and an angle of said second reflecting surface with respect to the optical axis of each of said plurality of image convex lenses is also approximately 30°.

9. A plastic lens array as claimed in claim 1, wherein said plurality of object convex lenses and said plurality of image convex lenses are respectively divided into first and second groups such that the optical axes of the first group of said plurality of image convex lenses are dislocated toward a first outer end of said lens array body member relative to the optical axes of a corresponding group of the plurality of object convex lenses, and the optical axes of the second group of said plurality of image convex lenses are dislocated toward a second outer end of said lens array body member relative to the optical axes of a corresponding group of the plurality of object convex lenses.

10. A plastic lens array as claimed in claim 1, wherein said plurality of object convex lenses and said plurality of image convex lenses are respectively divided into first outer, second outer and third middle groups such that the optical axes of said first and second outer groups of said plurality of image convex lenses are dislocated toward respective first and second outer ends of said lens array body member relative to the optical axes of corresponding groups of said plurality of object convex lenses, and the optical axes of said third middle group of said plurality of image convex lenses coincide with the optical axes of a corresponding middle group of said plurality of object convex lenses.

11. A plastic lens array as claimed in claim 1, further comprising:
array fitting pieces provided at both ends of said lens array body member respectively and projecting outwardly therefrom along a longitudinal axis of said lens array body member.

* * * * *

UNITED STATES PATENT AND TRADEMARK OFFICE
CERTIFICATE OF CORRECTION

PATENT NO. : 4,747,667

DATED : May 31, 1988

INVENTOR(S) : AKIRA TANAKA et al.

It is certified that error appears in the above-identified patent and that said Letters Patent is hereby corrected as shown below:

Col. 5
Line 17, delete "disclosed" and insert --dislocated--.

Col. 6
Line 14, delete "disclosed" and insert --dislocated--.

Signed and Sealed this

Eighteenth Day of October, 1988

Attest:

DONALD J. QUIGG

Attesting Officer

Commissioner of Patents and Trademarks